(12) United States Patent
Tennyson et al.

(10) Patent No.: US 6,449,362 B1
(45) Date of Patent: Sep. 10, 2002

(54) APPARATUS, SYSTEMS AND METHODS FOR ISOLATING ADSL SIGNALS FROM POTS SIGNALS

(75) Inventors: Gary Tennyson, Alabaster; D. A. Wilmont, Birmingham, both of AL (US)

(73) Assignee: BellSouth Intellectual Property Corporation, Wilmington, DE (US)

(*) Notice: Subject to any disclaimer, the term of this patent is extended or adjusted under 35 U.S.C. 154(b) by 0 days.

(21) Appl. No.: 08/971,394

(22) Filed: Nov. 17, 1997

(51) Int. Cl.$^7$ ................................................ H04M 1/00
(52) U.S. Cl. ........................ 379/413.02; 379/399.01; 379/397
(58) Field of Search ...................... 379/21, 99, 397, 379/399.01, 413.02, 413.03, 413.04; 340/568

(56) References Cited

U.S. PATENT DOCUMENTS

| | | | |
|---|---|---|---|
| 4,935,725 A | * | 6/1990 | Turnau ..................... 340/568.4 |
| 5,027,426 A | | 6/1991 | Chiocca, Jr. |
| 5,369,666 A | | 11/1994 | Folwell et al. |
| 5,408,260 A | | 4/1995 | Arnon |
| 5,410,343 A | | 4/1995 | Coddington et al. |
| 5,440,335 A | | 8/1995 | Beveridge |
| 5,461,616 A | | 10/1995 | Suzuki |
| 5,469,495 A | | 11/1995 | Beveridge |
| 5,488,413 A | | 1/1996 | Elder et al. |
| 5,512,898 A | | 4/1996 | Norsworthy et al. |
| 5,519,731 A | | 5/1996 | Cioffi |
| 5,528,630 A | | 6/1996 | Ashley et al. |
| 5,534,912 A | | 7/1996 | Kostreski |
| 5,548,255 A | | 8/1996 | Spielman |
| 5,559,858 A | | 9/1996 | Beveridge |
| 5,561,424 A | | 10/1996 | Norsworthy et al. |
| 5,974,139 A | * | 10/1999 | McNamara et al. ........ 379/399 |

OTHER PUBLICATIONS

Suttle Apparatus Corporation, USOC Reference Guide, USOC Nos. RJ48S, RJ48X, RJ25C, and RJ31X.

(List continued on next page.)

*Primary Examiner*—Forester W. Isen
*Assistant Examiner*—Jefferey Harold
(74) *Attorney, Agent, or Firm*—Geoff L. Sutcliffe, Esq.; Kilpatrick Stockton LLP

(57) ABSTRACT

An apparatus for isolating ADSL signals from POTS signals includes a single low pass filter for filtering the POTS signals for all POTS terminal devices within a customer's premises. The low pass filter is mounted within a line isolation device (LID) connected between a telephone jack and an ADSL transceiver. The customer's wiring is altered so that the ADSL and POTS signals are supplied to blue (B) and yellow (Y) lines, rather than the typical connection to the red (R) and green (G) lines, and the LID returns filtered POTS signals on the R and G lines. The telephone jacks within the premises remain connected to the R and G lines and receive the filtered POTS signals from the LID. Instead of reconnecting incoming signals to the R and G lines upon removal of the ADSL transceiver, a jack is preferably used which automatically shorts the B and Y lines to the R and G lines, respectively, upon removal of the LID from one of the telephone jacks. A wall-mounted connector for coupling with the LID includes a pair of shorting bars. When the connector for the LID is inserted into the jack, a set of coupling members for making connections between the connectors are moved away from the shorting bars and are electrically isolated from each other. When the LID connector is inserted into the jack, each shorting bar contacts a pair of coupling members, thereby shorting the B and Y lines to the R and G lines, respectively.

31 Claims, 5 Drawing Sheets

OTHER PUBLICATIONS

Cook, J., "Telephony Transmission and Splitters, Passive and Active," American National Standards Institute Telecommunications Committee (ANSI/T1), T1E1, 4–94–043, Feb. 14–18, 1994, San Francisco, California.

Rauschmayer, D.J., "Effects of a Distributed POTS Splitter Topology on ADSL Line Transfer Functions," American National Standards Institute TIE1.4 Technical Subcommittee Report T1E1.4/96–167, Jul. 22, 1996.

Roberts, R. et al., "ADSL POTS LPF Placement," American National Standards Institute Working Group Report T1E1.4/96–162, Jul., 1996.

"Interface Between Carriers and Customer Installations—Analog Voicegards Switched Access Lines Using Loop–Start and Ground–Start Signaling," American National Standard for Telecommunications ANSI T1.401–1993, American National Standards Institute, New York, New York.

"Network and Customer Interfaces—Asymmetric Digital Subscriber Line (ADSL) Metallic Interface," American National Standard for Telecommunications ANSI T1.413–1995, Amernican National Standards Institute, New York, New York.

"IEEE Standard Methods and Equipment for Measuring the Transmission of Characteristics of Analog Voice Frequency Circuits," IEEE Std 743–1984, Nov. 14, 1984, The Institute of Electrical and Electronics Engineers, Inc., New York, New York.

* cited by examiner

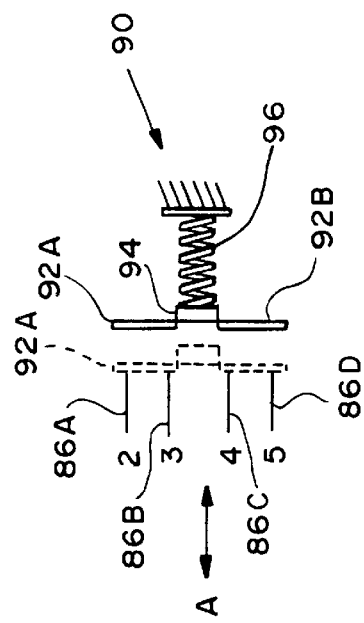
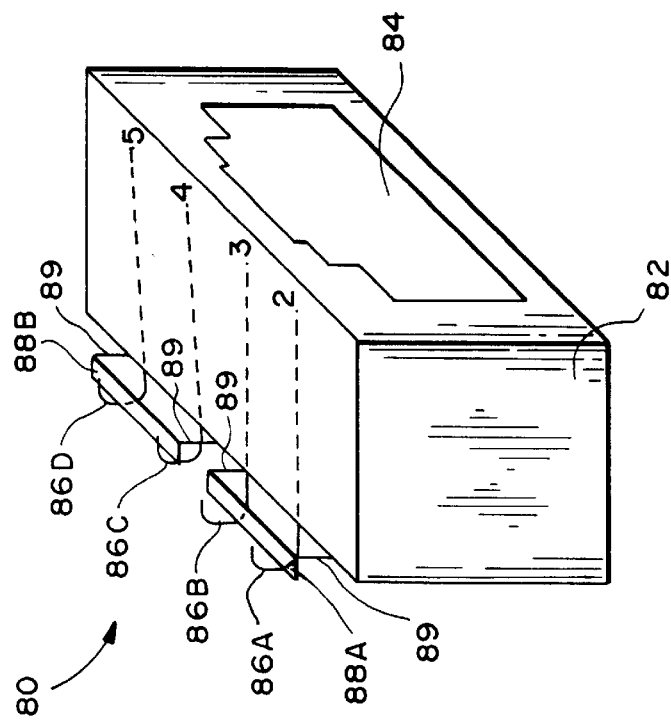

APPARATUS, SYSTEMS AND METHODS FOR ISOLATING ADSL SIGNALS FROM POTS SIGNALS

CROSS-REFERENCE TO RELATED APPLICATIONS

Reference is made to related application Ser. No. 08/812,296, filed Mar. 7, 1997, the disclosure of which is incorporated herein by this reference.

FIELD OF THE INVENTION

The present invention relates generally to apparatus, systems, and methods for isolating Plain Old Telephone Service (POTS) signals from higher band communication signals and, more particularly, for apparatus, systems, and methods for isolating POTS signals from Asymmetric Digital Subscriber Line (ADSL) signals.

BACKGROUND OF THE INVENTION

In general, modems designed for use with conventional telephone lines accommodate relatively low data transmission rates. While current modems can process a high-end bit rate at about 33.6 Kbits/second, they are nonetheless significantly slower than a digital modem, such as one on an ISDN line which can operate at 64 Kbits/second. These rates, unfortunately, remain too low for many desired types of communication, such as full-motion video which requires a minimum of 1.5 Mbits/second for VHS quality using MPEG-1 (Motion Pictures Expert Group) compression and 3 to 6 Mbits/second for broadcast quality using MPEG-2 compression.

A recently pronounced standard in telecommunications defines an Asymmetrical Digital Subscriber Line (ADSL) system which executes a high speed transfer of data over a single twisted-wire pair, such as an existing telephone line. In addition to Plain Old Telephone Services (POTS), an ADSL system also permits full-duplex and simplex digital services with data rates from about 1.5 Mbits/second to 7 Mbits/second. An ADSL system uses a spectrum from about 26 kHz to 1.1 MHz for broadband data transmission and leaves the spectrum from about DC to 4 kHz for POTS. An ADSL system provides at least four downstream simplex channels having rates ranging from about 1.5 Mbits/second to 6 Mbits/second and four full duplex channels with rates ranging from about 64 Kbits/second to 640 Kbits/second. An ADSL system is therefore more than capable of providing video-on-demand capability, video conferencing, data file transfer capability and can provide all of this capability simultaneously with POTS. For additional information, reference may be made to American National Standards Institute Standard ANSI-T1.413-1995 which describes an ADSL system and an interface between a telecommunications network and a customer's installation and which is incorporated herein by this reference.

With reference to FIG. 1, a standard ADSL system 10 may comprise an ADSL transceiver unit 12 at a central office (ATU-C) which communicates with an ADSL transceiver unit 14 at a customer premises (ATU-R). The ADSL transceiver unit 12 at the central office receives data from a digital network 15, performs various processing on the data, and transfers the processed data to a splitter 16. The splitter 16 combines the signals from the transceiver unit 12 with signals from a public switched telephone network (PSTN) 18 and transfers the combined signals onto a line 20. At the customer end, a splitter 22 supplies a lower-band set of signals to one or more POTS terminal devices 24 and a higher-band set of signals to the ADSL transceiver unit 14. The ADSL transceiver unit 14 at the customer's end processes the received signals and supplies the processed signals to one or more service modules (SM) 26. The processed data from the ADSL transceiver unit 14 may be supplied directly to the one or more service modules 26 or may be supplied through a customer installation distribution network 28. The network 28 may be any type of network, such as a star or bus network. Reference may be had to ANSI T1.413-1995 for additional information on the ADSL transceiver units 12 and 14 and on other aspects of the ADSL system 10, which is hereby incorporated by reference.

One difficulty with ADSL, however, is that the signals supplied to the ADSL transceiver 14 and the signals supplied to the POTS terminal device 24 must be isolated from each other. One reason requiring this isolation is that the POTS terminal device 24, which may be a telephone or other non-linear device, produces inter-modulation harmonics from the ADSL system both in the frequency range of the ADSL signals and in the voice band. Likewise, the ADSL transceiver unit 14 can generate interference with the signals supplied to the POTS terminal devices 24. Consequently, some type of filtering must occur between the ADSL transceiver 14 and the POTS terminal devices 24.

The signals supplied to the POTS terminal devices 24 may be isolated from the signals supplied to the ADSL transceiver unit 14 in any one of a multitude of ways. One of these ways is to place a low-pass filter at each POTS terminal device 24 and to place a high-pass filter at either the ADSL transceiver unit 14 or at a network interface device (NID). For instance, the low pass filters may be placed in series between the POTS terminal devices 24 and their connection to a wall jack. These low pass filters would then filter out the higher band ADSL signals and prevent the ADSL signals from interfering with the POTS signals.

The placement of the low-pass filter at each POTS terminal device, however, adversely affects the overall performance of the ADSL system 10. The lines connecting the POTS terminal devices 24 to the low pass filters look like bridge taps to the ADSL line and produce significant losses at the top end of the downstream ADSL band transfer function, such as losses from 5 dB to 15 dB between 400 kHz and 1.1 MHz. The reason for these losses and their effects on the ADSL system 10 are explained in more detail in Dennis J. Rauschmayer, "Effects of a Distributed POTS Splitter Topology on ADSL Line Transfer Functions," American National Standards Institute T1E1.4 Technical Subcommittee Report T1E1.4/96-167, Jul. 22, 1996, which is incorporated herein by this reference. The placement of low-pass filters at each POTS terminal device 24 is therefore undesirable due to their effects on the ADSL signals.

In contrast to the placement of a low-pass filter at each POTS terminal device 24, the use of a single low pass filter for all POTS terminal devices 24 produces more favorable results. For instance, a comparison between the placement of the low-pass filter at each phone drop versus the placement of the low-pass filter at a split is described in a report by Rick Roberts et al., "ADSL POTS LPF Placement," American National Standards Institute Working Group Report T1E1.4/96-162, July, 1996, which is incorporated herein by this reference. This report suggests that a single low-pass filter at the split is preferred since a distributed low-pass filter at each phone causes several problems, such as a reduced bit rate and reduced reach of the ADSL system, an increase in line driver current, a hybrid/echo cancellation stress, and risk of improper installation or improper network modification. Thus, rather than placing a low-pass filter at each POTS terminal device 24, the ADSL system 10 should preferably have a single low-pass filter installed at the split so that the signals supplied to all of the POTS terminal devices 24 are filtered by this single low pass filter.

A single low-pass filter, however, is not as easily installed at a split as are multiple low-pass filters at each POTS terminal device 24. With multiple low-pass filters, a low-pass filter can be easily incorporated to the telephone network by simply adding a filter between each POTS terminal device 24 and its connection to the customer's telephony wiring, such between the POTS terminal device 24 and a wall jack. The single low-pass filter, on the other hand, must be located at a point along the customer's wiring which is shared by all POTS terminal devices 24 but not at a location which might affect ADSL signals traveling to and from the ADSL transceiver unit 14.

When the customer's premises is an apartment, adding a low-pass filter to the telephony wiring becomes especially difficult. A typical wiring diagram 30 for an apartment is shown in FIG. 2. The wiring 30 for an apartment includes an inside network interface ("INI") 32 within which is contained a customer demarcation point. The customer demarcation point often comprises a testing jack 36 having a female jack 36A receiving tip and ring signals from the central office ("CO") and a male jack 36B connected to lines 38A and 38B. The tip and ring signals provided on lines 38A and 38B are provided to a red ("R") terminal and a green ("G") terminal which carry the tip and ring signals over R and G lines 39A and 39B, respectively, to telephone jacks 34 within the apartment. Each of the telephone jacks, which commonly are RJ11 jacks, is connected in parallel to the other telephone jacks through the R and G lines 39A and 39B and each receives the tip and ring signals from the INI 32. Although two telephone jacks 34 have been shown, an apartment may comprise any number of telephone jacks 34. Each telephone jack 34 has a pair of lines 42A and 42B respectively connected to the R and G terminals, and consequently to the R and G lines 39A and 39B, for carrying the tip and ring signals to a female connector 44 of the RJ11 jack 34. A corresponding male connector of a POTS terminal device 24, such as a male RJ11 connector, may be inserted within the female connector 44 to carry telephony signals to the POTS terminal device 24.

As discussed above, a single low-pass filter is preferably installed within the customer's telephony wiring in order to provide filtering for all POTS terminal devices 24. One possible location for the low-pass filter is between the female connector 36A of the testing jack 36 and the R and G terminals within the INI 32. The INI 32, however, is a small enclosure and does not have any space to receive a low-pass filter. The INI 32 is often located within the kitchen of an apartment and includes a wall-mounted RJ11 telephone jack 34, whereby it would be both difficult and expensive to replace or modify the INI 32 to incorporate a low pass filter. A suitable location for the low-pass filter is therefore difficult to find within an apartment.

An apartment presents other problems as well in installing a low pass filter for ADSL services. For instance, tenants of apartments are relatively transient and frequently do not stay within a particular apartment for a prolonged period of time. If a tenant desires ADSL services, as discussed above, the wiring within the apartment must be modified to incorporate the low pass filter. The landlord and tenant may be unwilling to make the change in the wiring if it would require a substantial amount of work to the premises or if it would involve a significant cost. Additionally, some landlords may be unwilling to authorize the change if the apartment could not be easily reverted back to a POTS only service. Any change to the customer's wiring 30 to accommodate ADSL service should therefore be easy and inexpensive to install and should be easily reconverted to POTS only service.

The problems discussed above with reference to modifying the customer's wiring 30 to include a low-pass filter is not limited to apartments but applies to any residential or commercial building. Moreover, the problems of installing a low-pass filter are not limited to INIs 32 but are endemic to other types of interface devices, such as an outside network interface ("ONI") device, any network interface device ("NID"), as well as in locations not having any type of interface device.

SUMMARY OF THE INVENTION

The present invention solves the problems described above by providing apparatus, systems, and methods for isolating POTS signals from higher band communication signals, such as ADSL signals. In a customer's telephony wiring, incoming calls are customarily routed to red and green lines of the wiring and all telephone jacks are wired to receive POTS signals over these red and green lines. With the invention, the incoming calls, including the POTS signals and the ADSL signals, are provided to blue and yellow lines of the customer's telephony wiring. A low pass filter is connected so that its input is connected to the blue and yellow lines and its output is connected to the red and green lines. The low pass filter removes the ADSL signals from the POTS signals and provides filtered POTS signals over the red and green lines to all telephone jacks within the customer's telephony wiring. The ADSL signals are received over the blue and yellow lines and are provided to a transceiver unit.

In the preferred embodiment, the switching of the incoming calls from the red and green lines to the blue and yellow lines occurs within an interconnect device, such as an inside network interface device. A line isolation device (LID) houses the low pass filter and includes a communication jack for routing at least the ADSL signals to the transceiver unit. The LID also preferably includes a telephone jack for receiving the filtered POTS signals from the low pass filter and for providing a connection to a POTS terminal device. The LID is connected to a telephone jack within the customer's wiring which has been modified so that it is connected to each of the blue, red, green, and yellow lines. In this manner, the modified telephone jack can route the incoming ADSL signals and POTS signals over the blue and yellow lines to the LID and can route filtered POTS signals from the LID to the other telephone jacks over the red and green lines.

The telephone jack for connecting the LID to the customer's wiring preferably includes a connector having a pair of shorting bars. The shorting bars automatically short the blue and red lines together and short the green and yellow lines together when a mating connector from the LID is removed from the connector. In this manner, when the LID is disconnected from the customer's wiring, the POTS signals are automatically routed from the blue and yellow lines to the red and green lines whereby all POTS terminal devices can continue to receive POTS signals over the red and green lines. When the mating connector from the LID is inserted into the connector, however, the shorting bars no longer short the lines together and the connector is able to carry the POTS signals and ADSL signals over the blue and yellow lines and is able to carry the filtered POTS signals over the red and green lines.

Accordingly, it is an object of the present invention to provide apparatus, systems, and methods which can easily add ADSL service to a customer's wiring.

It is another object of the present invention to provide apparatus, systems, and methods which can easily remove ADSL service from a customer's wiring.

It is a further object of the present invention to provide apparatus, systems, and methods for automatically switching between POTS only service and service for both POTS and ADSL.

It is yet another object of the present invention to provide apparatus, systems, and methods for low pass filtering all POTS signals in premises having ADSL service.

It is yet a further object of the present invention to provide apparatus, systems, and methods for isolating POTS signals from ADSL signals.

BRIEF DESCRIPTION OF THE DRAWINGS

The accompanying drawings, which are incorporated in and form a part of the specification, illustrate preferred embodiments of the present invention and, together with the description, serve to explain the principles of the invention. In the drawings:

FIG. 5 is a diagrammatic view of a connector for receiving an ADSL connector according to a first embodiment of the invention; and FIG. 6 is a diagrammatic view of a connector for receiving an ADSL connector according to a second embodiment of the invention.

DETAILED DESCRIPTION

Figure 3:
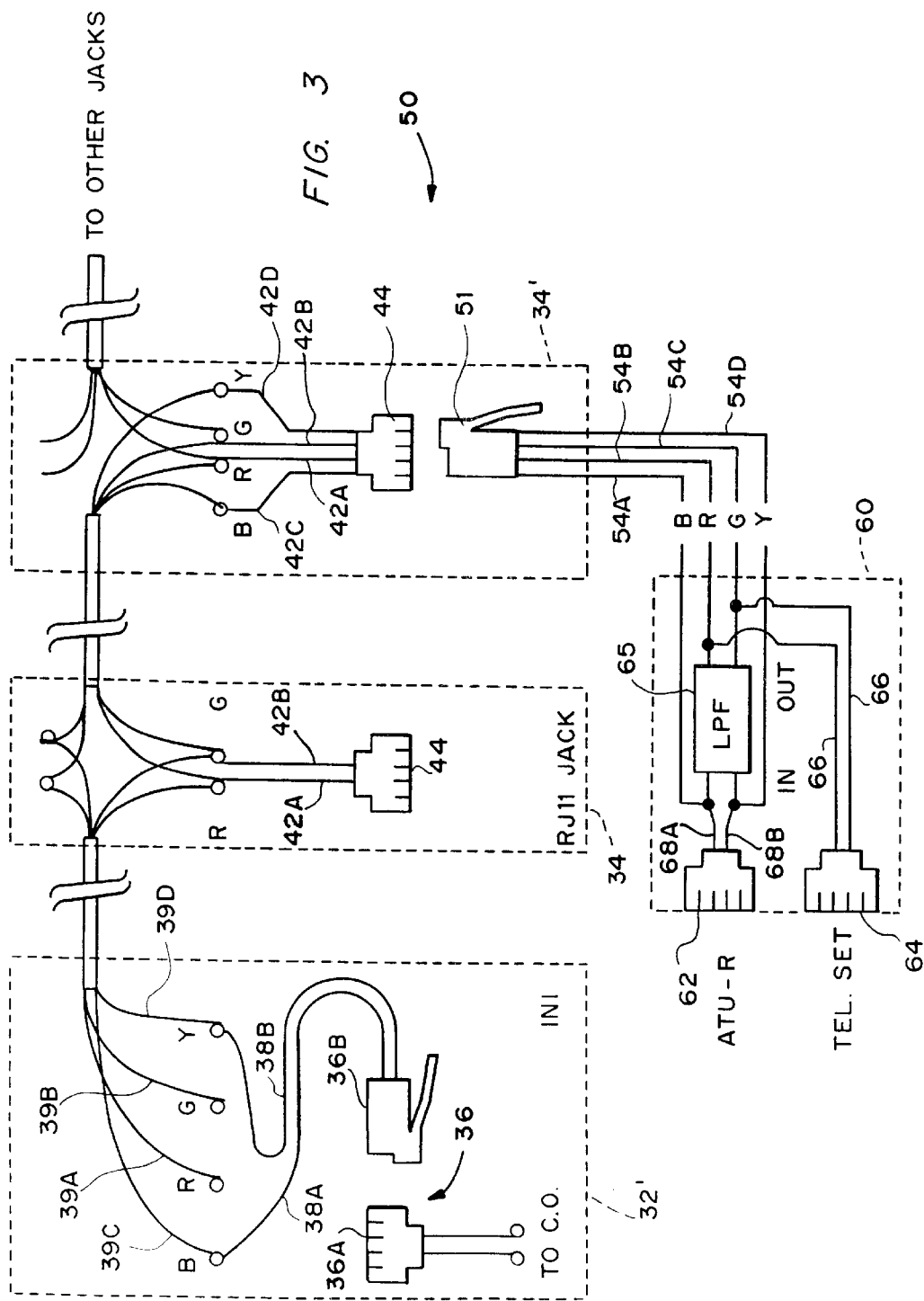
FIG. 3 is a wiring diagram for an apartment accommodating ADSL signals according to a first embodiment of the invention.

Reference will now be made in detail to preferred embodiments of the invention, non-limiting examples of which are illustrated in the accompanying drawings. With reference to FIG. 3, a customer's wiring 50 according to a preferred embodiment of the invention comprises an inside network interface (INI) 32'. The INI 32', as with the INI 32 in the typical customer's wiring 30, includes the testing jack 36 having a female connector 36A and male connector 36B. The INI 32', in contrast to the INI 32, has lines 38A and 38B from the connector 36B connected to the blue ("B") terminal and yellow ("Y") terminal, respectively. Thus, the tip and ring signals from the central office are carried by the lines 38A and 38B to the B and Y terminals within the INI 32' rather than to the R and G terminals. The incoming signals are routed throughout the customer's wiring over the blue and yellow lines 39C and 39D.

The wiring 50 for an apartment having ADSL service is similar to the typical wiring 30 in that it has a plurality of telephone jacks 34, which preferably comprise RJ11 jacks. To simplify the drawing, only one telephone jack 34 has been shown in FIG. 3, although an apartment will typically have numerous such jacks 34. Each of the telephone jacks 34 has lines 42A and 42B connected to the R and G terminals and R and G lines 39A and 39B for carrying tip and ring signals to female connector 44 and thus to any connected POTS terminal device 24.

In addition to the typical telephone jacks 34, the telephony wiring 50 also includes a telephone jack 34'. The jack 34' is similar to the other telephone jacks 34 in that lines 42A and 42B are connected to the R and G lines 39A and 39B, respectively. The jack 34', however, also has lines 42C and 42D connected to the B and Y lines 39C and 39D, respectively. Thus, whereas the typical jack 34 is only connected to the R and G lines 39A and 39B, the jack 34' has lines 42A to 42D for connecting the female connector 44 to each of the R, G, B, and Y lines 39A to 39D, respectively.

The customer's wiring 50 also includes a line isolation device (LID) 60 coupled to the telephone jack 34'. The LID 60 is connected through lines 54 to a male connector 51, which preferably comprises a male RJ11 jack. When the connector 51 is inserted into connector 44 of jack 34', lines 54A, 54B, 54C, and 54D are respectively connected to the B, R, G, and Y coupling members of the female connector 44, and hence to the B, R, G, and Y lines of the jack 34'.

The LID 60 also includes a low-pass filter 65. In general, the low pass filter 65 must sufficiently attenuate ADSL signals while passing through all POTS signals. To determine the amount of attenuation that the filter 65 must provide, an ADSL transceiver 14, such as one manufactured by Westell Technologies, Inc., was bridged across a pair of 500-type telephone sets along with a network simulator and the amount of intermodulation products was measured by a transmission measurement set. With a 13 dBm ADSL signal, the transmission measurement set indicated that a value of about −39 dBm of noise power was introduced into the voice band. This noise level was found to be fairly independent of the loop current level or switched status of the telephone sets. The ADSL to voiceband conversion loss was therefore determined to be approximately 52 dB.

The measurements of the noise level was performed in accordance with IEEE Standard 743 relating to the measurement of transmission characteristics of analog voice frequency circuits. The noise level was C-message weighted whereby the noise was weighted according to its perceived annoyance to a typical listener of standard telephone services. The −39 dBm of noise introduced by the ADSL transceiver corresponds to about 50 dB relative noise C-message weighting (dBrnC). To lower the noise level in the voice band to an acceptable limit of 20 dBrnC, approximately 30 dB of attenuation is needed by the filter 65.

The filter 65 preferably comprises a four-pole filter which provides a low loss at the high end of voiceband and provides about 30 dB of attenuation for frequencies at and above 15 kHz. Although a three-pole filter may provide a sufficient amount of roll-off above 15 kHz, the four-pole filter is preferred since it presents a high bridging impedance to the ADSL line.

The LID 60 also includes a female connector 62 for connection to the ADSL transceiver 14 ("ATU-R") and a female jack 64 for connection to a POTS terminal device 24. The jack 64 is connected to the R and G lines 54B and 54C through lines 66. As shown in the figure, the B and Y lines 54A and 54D are respectively shorted to R and G lines 68A and 68B, which interconnect the jack 62 to the low-pass filter 65.

Figure 1:
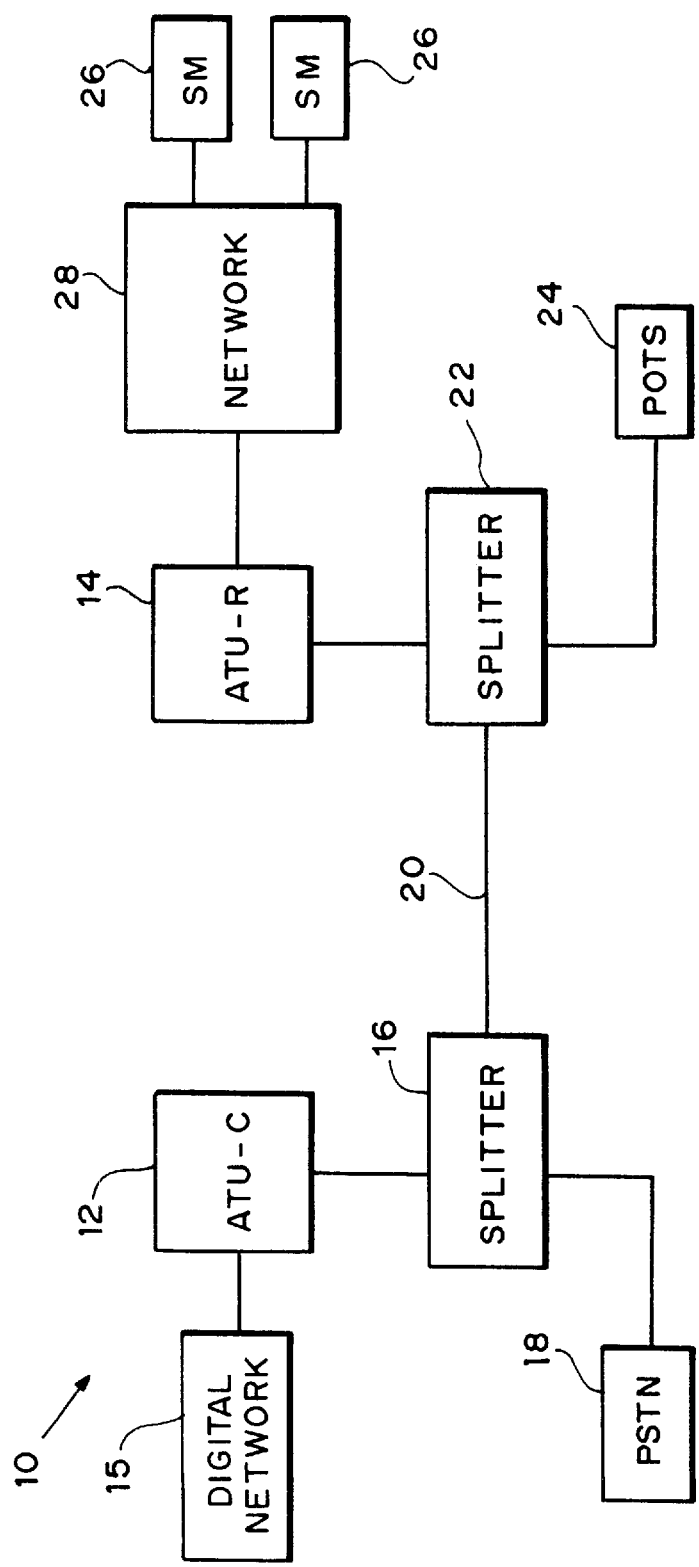
FIG. 1 is a block diagram of a typical ADSL system.
Figure 2:
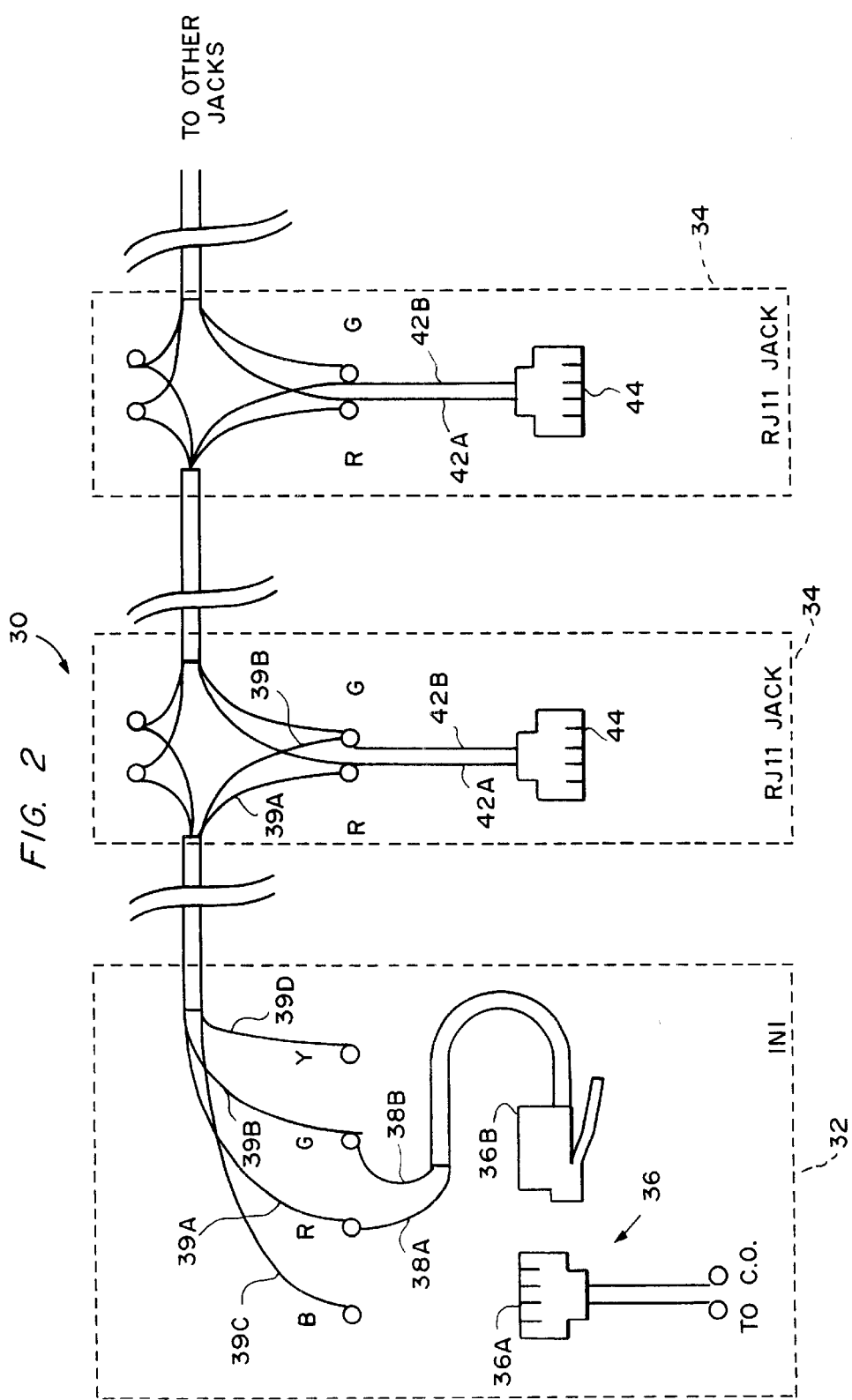
FIG. 2 is a typical telephony wiring diagram for an apartment.

In contrast to the typical wiring 30 shown in FIG. 2, the wiring 50 supplies the tip and ring signals from the central office to the B and Y lines 39C and 39D of the INI 32'. The remaining telephone jacks 34 are not modified and instead the lines 42A and 42B remain connected to the R and G lines 39A and 39B, respectively. With wiring 50, both the POTS signals and the ADSL signals are supplied from the central office to the B and Y lines 39C and 39D within the INI 32'. Because the telephone jacks 34 remain connected to the R and G lines, the telephone jacks 34 do not receive the POTS signals directly from the INI 32'.

Both the ADSL signals and the POTS signals are supplied from the INI 32' to the modified jack 34' over the B and Y lines 39C and 39D. Within jack 34', the POTS and ADSL signals are routed over lines 42C and 42D, through connectors 44 and 51, and eventually to lines 54A and 54D. The ADSL and POTS signals are then routed to lines 68A and 68B and are supplied through connector 62 to the ADSL transceiver 14. The ADSL transceiver 14 preferably incorporates a high-pass filter for removing the POTS signals and for delivering only the ADSL signals for processing by the ADSL transceiver 14. The preferred ADSL transceiver 14 is manufactured by Alcatel and receives the signals over the R and G coupling members of connector 62. The LID 60 may include a high pass filter for passing only the ADSL signals to the transceiver unit 14 or this high pass filter may be included within the ADSL transceiver unit 14.

In addition to being routed to the connector 62, the POTS signals and the ADSL signals are also supplied over lines 68A and 68B to the input of the low-pass filter 65. A filtered output of the low-pass filter 65, which includes only the POTS signals, is placed on lines 54B and 54C and are supplied over lines 66 to the telephone jack 64. The filtered POTS signals are also supplied from lines 54B and 54C to lines 42A and 42B through connectors 51 and 44. The lines 42A and 42B are connected to the R and G lines 42A and 42B of the jack 34' and over the R and G lines 39A and 39B to all telephone jacks 34 in the customer's wiring 50. Thus, for instance, telephone jack 34 receives the filtered POTS signals from the jack 34' and supplies the filtered POTS signals to its female connector 44. A POTS terminal device 24 may then be connected to any one of the jacks 34 to receive the filtered POTS signals.

The wiring 50 allows ADSL signals to be supplied to an ADSL transceiver 14 while providing filtered POTS signals to all POTS terminal devices 24 within a customer's premises. The wiring 50 advantageously uses only a single low-pass filter 65 for filtering the POTS signals for all POTS terminal devices 24 so as to not introduce losses at the top end of the ADSL band transfer function.

A customer or technician can easily equip a customer's premises to receive ADSL signals. To convert an apartment or other type of premise into an "ADSL ready" premise, the INI 32 is modified to the INI 32' by moving lines 38A and 38B from the R and G terminals to the B and Y terminals, respectively. The telephone jack 34 which is located near the ADSL transceiver 14 is changed to the jack 34' by connecting lines 42C and 42D to the B and Y lines 39C and 39D, respectively. After the LID 60 is connected to the jack 34', all telephone jacks 34 within the customer's premises can receive POTS which have been filtered by the low-pass filter 65. With the wiring 50, a low pass filter 65 is added outside of the INI 32' and only the wiring in one telephone jack 34' needs to be modified. The typical customer's wiring 30 can therefore be easily converted into wiring 50 to accommodate ADSL signals.

The wiring 50 can also be easily reverted back into the wiring 30. If a customer no longer desires ADSL service, then the INI 32' is returned to INI 32 by moving lines 38A and 38B from the B and Y lines 39C and 39D to the R and G lines 39A and 39B, respectively. With this single change, the POTS signals delivered from the central office are routed through testing jack 36 to the R and G lines 39A and 39B within the INI 32. Since the telephone jacks 34 and telephone jack 34 have their lines 42A and 42B connected to the R and G lines 39A and 39B, the POTS signals will be delivered in a typical manner to any POTS terminal device 24 coupled to a telephone jack 34.

Although the customer's wiring 50 can be easily switched back to POTS only service, some customers are incapable or unwilling to make such a change and others may not know that such a change is necessary. For instance, if a customer having ADSL service leaves an apartment and the new tenant does not have ADSL service, the new tenant may have no reason to suspect that his or her telephony wiring had been altered to accommodate ADSL service. When the new tenant attempts to connect a POTS terminal device 24 to a jack 34 or to jack 34', the tenant would not receive a dial tone signal and would likely assume that his or her local telephone company had not established service. In such a situation, if the telephone company tested the line at testing jack 36, the telephone company would detect the tip and ring signals at connector 36A and would inform the tenant that the problem lies within the customer's wiring 50. Many customers would be unable, or at least unwilling, to discover and correct the problem and would have to hire someone to restore service. Even if the new tenant was informed that the previous tenant had ADSL service and instructed the customer of what changes were needed, many customers would still find it necessary to hire someone else to correct the problem. As a result, customers entering new premises may find themselves without telephone service for a prolonged period of time.

The problems in changes in converting premises between ADSL service and POTS only service is not limited to apartments but also applies to any other residential or even commercial premise. Because a primary benefit of ADSL service over some competing digital services is that it uses existing telephony wiring to provide digital service whereby a customer's premises can be easily and quicky upgraded to ADSL service, any difficulty in modifying the customers'wiring to carry ADSL signals decreases the overall appeal of ADSL service.

Figure 4B:
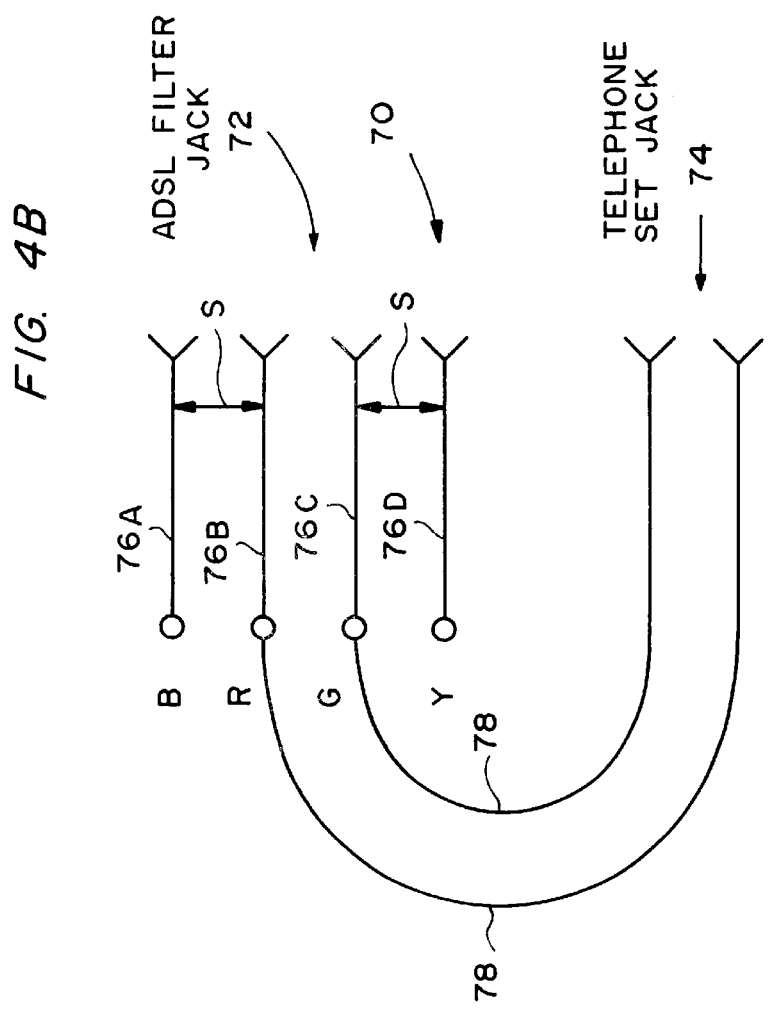
FIG. 4B is an internal wiring diagram of the ADSL jack.
Figure 4A:
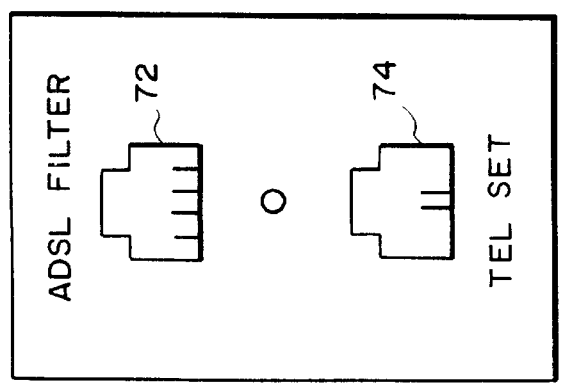
FIG. 4A is a front view of an ADSL jack.

The telephone jack 34' preferably includes a jack 70 which eliminates the need for anyone to manually alter the customer's wiring 50 in order to switch between POTS only service and ADSL and POTS service. With reference to FIGS. 4A and 4B, the jack 70 includes a female connector 72 dedicated for ADSL signals and may also include a female jack 74 for providing POTS signals. The connector 74 is preferably an RJ11 jack but need not be included as part of the jack 70. The connector 72, as shown in more detail in FIG. 4B, includes coupling members 76A, 76B, 76C, and 76D for the B, R, G, and Y signal lines, respectively. The jack 70 also includes lines 78 for routing signals supplied over the R and G lines to the telephone jack 74 and shorting bars S, which are represented by arrows, for shorting coupling member 76A coupling member 76B and for shorting coupling member 76C to coupling member 76D. The purpose for the shorting bars S and examples of their construction will be described in further detail below.

As shown in FIG. 4A, the jack 72 for ADSL signals is preferably labeled as "ADSL filter" to notify customers that only an ADSL transceiver 14 may be connected to that jack 72. When connector 51 is inserted into jack 72, the coupling members 76A and 76B are electrically isolated from each other and coupling members 76C and 76D are electrically isolated from each other. Thus, when the connector 51 is inserted into jack 72, ADSL and POTS signals are supplied over coupling members 76A and 76D to lines 54A and 54D, respectively, and then to jack 62 over lines 68A and 68B. The ADSL signals are filtered by the low-pass filter 65 and filtered POTS signals are routed over lines 54B and 54C through connector 51 to coupling members 76B and 76C. The coupling members 76A to 76D are connected to lines 42A to 42D, respectively. The filtered POTS signals may then be supplied over lines 78 to the telephone jack 74 and over the R and G lines 39A and 39B to other telephone jacks 34. Thus, when the shorting bars S are in a first state, the jack 70 recieves both the ADSL signals and POTS signals from the B and Y lines 39C and 39D and places filtered POTS signals on the R and G lines 39A and 39B.

The jack 70 also appropriately routes the POTS signals if the connector 51 is removed from the jack 70. If the jack 51 is removed from the ADSL jack 72, the shorting bars S are placed in a second state to short pairs of coupling members 76 together. As a result of the connector 51 being removed, the coupling members 76A and 76B become electrically connected to each other and coupling members 76C and 76D become electrically connected to each other. With connections being made between coupling members 76A and 76B and between coupling members 76C and 76D, POTS signals received from the B and Y lines 39C and 39D are shorted to the R and G lines 39A and 39B. Since the telephone jacks 34 are wired to receive the tip and ring signals over the R and G lines 39A and 39B, all telephone jacks 34 within the premises can receive POTS signals. Thus, when the ADSL transceiver 14 is removed from the customer's wiring 50 and the connector 51 is removed from the ADSL jack 72, the shorting bars S are placed in a second state to route the POTS signals from the B and Y lines 39C and 39D to the R and G lines 39A and 39B.

The shorting bars S may be constructed in any suitable manner. A first embodiment of a female connector 80 for the ADSL jack 72 is shown in FIG. 5. The connector 80 includes a body 82 having an orifice 84 for receiving the connector 51. The connector 80 includes a number of coupling members 86A, 86B, 86C, and 86D which are connected in a conventional manner to lines 42C, 42A, 42B, and 42D, respectively. The coupling members 86 preferably comprise those of a typical female RJ11 jack which form an electrical connection with an inserted male connector. In the connector 80, the coupling members 86 allow an electrical interconnection between the lines 42, which are connected to the female connector 80, and lines 54, which are connected to the male jack 51.

When the connector 51 is inserted into the connector 80, the connector 80 is placed in a first state and the POTS signals and ADSL signals are routed from the B and Y lines 39C and 39D to the LID 60 and filtered POTS signals are routed from the LID 60 and are placed on the R and G lines 39A and 39B. With reference to FIG. 5, as the male connector 51 is inserted into the orifice 84, the male connector 51 makes contact with the coupling members 86 and raises the coupling members 86 to the positions shown by members 86A and 86B. At the positions illustrated by coupling members 86A and 86B, the coupling members 86 are not in contact with shorting bars 88 and function to make a connection between lines 54A to 54D and lines 42C, 42A, 42B, and 42D, respectively.

When the connector 51 is removed from the connector 80, the connector 80 is placed in a second state and all signals received from the B and Y lines 39C and 39D are shorted onto the R and G lines 39A and 39B. When the connector 51 is removed from the aperture 84, the coupling members 86 return downwardly to their initial positions, as illustrated by coupling members 86C and 86D. As shown in FIG. 5, ends of the coupling members 86C and 86D loop around the rear of the connector 80 and rest upon shorting bar 88B. The shorting bar 88B is electrically conductive and shorts line 42D to line 42B. The shorting bar 88A operates in the same manner as shorting bar 88B to short line 42C to 42A when the connector 51 is removed from connector 80. The shorting bars 88 are secured to the body 82 of the connector 80 by mounting posts 89, which are preferably formed of insulating material so as to isolate the shorting bars 88 from the body 82 of the connector 80. Thus, when the connector 51 is removed from connector 80, the shorting bars 88 couples the B and Y lines 39C and 39D to the R and G lines 39A and 39B, respectively, thereby permitting the transfer of POTS signals to all telephone jacks 34 within the customer's wiring 50.

To illustrate the operation of the connector 80, coupling members 86C and 86D have been depicted in positions associated with their first state in which the connector 51 is inserted while coupling members 86A and 86B have been depicted in positions associated with their second state in which the connector 51 is withdrawn. During operation of the connector 80, however, the positions of the coupling members 86 will all be the same. In other words, if the connector 51 is inserted into the orifice 84, then all of the coupling members 86A to 86D will be raised off of the shorting bars 88, as depicted by the positions of coupling members 86C and 86D in FIG. 5. On the other hand, if the connector 51 is withdrawn from the orifice 84, then all of the coupling members 86 will be resting on the shorting bars 88, as shown by the positions of coupling members 86A and 86B in FIG. 5. The lines 42 are connected to the coupling members 86 in a manner similar to that of connector 44 and accordingly these connections have been omitted to simplify the drawing.

FIG. 6 illustrates a second embodiment of a female connector 90 for the ADSL jack 72. The connector 90, shown in diagrammatic view in FIG. 6, includes a pair of shorting bars 92A and 92B mounted to a spacer 94. The spacer 94 is formed of a dielectric material so as to electrically insulate the shorting bars 92A and 92B from each other. The spacer 94 is mounted to one end of a spring 96 with the other end of the spring 96 secured to a fixed location within the jack 72. The shorting bars 92A and 92B are positioned so that when the connector 51 is inserted into the jack 72, the shorting bars 92A and 92B are moved away from the coupling members 86A to 86D. With the shorting bars 92 in this first state, as shown by the solid lines in FIG. 6, the coupling members 86A to 86D provide electrical connections between lines 54A to 54D and lines 42C, 42A, 42B, and 42D, respectively. Consequently, when the connector 51 is inserted into the connector 90, ADSL signals and POTS signals are routed from the B and Y lines 39C and 39D over lines 42C and 42D to the LID 60 and filtered POTS signals from the LID 60 are routed over lines 42A and 42B to the R and G lines 39A and 39B and to all telephone jacks 34 within the customer's wiring 50.

When the connector 51 is removed from the connector 90, the shorting bars 92A and 92B are placed into a second state. In this second state, the shorting bars 92 are no longer pushed back by the connector 51 but instead are biased toward the coupling members 86 by the spring 96. As shown by dashed lines in FIG. 6, shorting bar 92A makes contact with coupling members 86A and 86B and shorting bar 92B makes contact with coupling members 86C and 86D. Thus, when the connector 51 is removed, lines 42C and 42A become shorted together and lines 42B and 42D become shorted together, thereby shorting the B and Y lines 39C and 39D to the R and G lines 39A and 39B, respectively. Thus, when the connector 51 is removed, POTS signals are passed from the B and Y lines 39C and 39Ds to the R and G lines 39A and 39B. The telephone jacks 34 within the customer's premises, since they are all connected to the R and G lines 39A and 39B, automatically receive the POTS signals from the connector 90.

The forgoing description of the preferred embodiments of the invention has been presented only for the purpose of illustration and description and is not intended to be exhaustive or to limit the invention to the precise forms disclosed. Many modifications and variations are possible in light of the above teaching.

For example, although the invention has been described with reference to RJ11 jacks, the invention may operate with other telephone jacks. Further, although an INI is shown in figures, the invention is not limited to premises that have an INI but instead may be used in premises having other types of interconnect devices. Additionally, either one or both of the telephone jack 64 at the LID 60 and the telephone jack 74 at jack 70 may be omitted. Also, although the LID 60 has been shown as a stand-alone unit, the LID 60 may be integrated into an ADSL transceiver unit 14. The invention is not limited to isolating ADSL signals from POTS signals but may be used to isolate any type of higher band communication signal from the POTS signals.

Also, although the low pass filter 65 has been described as being integral with the ADSL jack 62, the low pass filter 65 and jack 62 may be housed separately. For instance, the low pass filter 65 may be coupled to any jack which is connected to each of the B, R, G, and Y lines. The low pass filter 65 would receive POTS signals and ADSL signals over the B and Y lines and would provide filtered POTS signals onto the R and G lines. The ADSL jack 62 may be located at another jack that is connected to at least the B and Y lines and which carries at least the ADSL signals to the transceiver unit 14.

The embodiments were chosen and described in order to explain the principles of the invention and their practical application so as to enable others skilled in the art to utilize the invention and various embodiments and with various modifications as are suited to the particular use contemplated.

What is claimed is:

1. An apparatus for isolating Plain Old Telephone Service (POTS) signals from higher band communication signals within a customer's telephony wiring, the customer's telephony wiring having a POTS pair of lines for carrying POTS signals to at least one POTS terminal device, comprising:

a connector for coupling with a telephone jack located within the customer's telephony wiring, the telephone jack being located within customer premises and being connected to the POTS pair of lines and to a non-POTS pair of lines within the customer's telephony wiring;

a first pair of lines for receiving the POTS signals and the higher band communication signals from the telephone jack through the connector, the first pair of lines being coupled to the non-POTS pair of lines within the customer's telephony wiring;

a low pass filter for receiving the POTS signals and the higher band communication signals from the first pair of lines and for outputting filtered POTS signals;

a second pair of lines for carrying the filtered POTS signals from the low pass filter to the telephone jack through the connector, the second pair of lines being coupled to the POTS pair of lines within the customer's telephony wiring;

wherein the connector is for receiving the POTS signals and the higher band communication signals from the non-POTS pair of lines through the telephone jack over the first pair of lines and is for providing filtered POTS signals to the telephone jack over the second pair of lines and wherein the second pair of lines is coupled to the POTS pair of lines so that the POTS terminal device receives the filtered POTS signals.

2. The apparatus as set forth in claim 1, wherein the first pair of lines is for carrying the POTS signals and the higher band communication signals from B and Y lines of the telephone jack.

3. The apparatus as set forth in claim 1, wherein the second pair of lines is for carrying the filtered POTS signals to red and green lines of the telephone jack.

4. The apparatus as set forth in claim 1, wherein the higher band communication signals comprise ADSL signals and the low pass filter is for removing the ADSL signals from the POTS signals.

5. The apparatus as set forth in claim 1, further comprising a second connector for receiving the higher band communication signals and the POTS signals from the first pair of lines and for supplying at least the higher band communication signals to a transceiver unit.

6. The apparatus as set forth in claim 5, further comprising a third pair of lines for coupling the second connector to the first pair of lines.

7. The apparatus as set forth in claim 1, further comprising a second telephone jack for receiving the filtered POTS signals from the second pair of lines.

8. A system for isolating Plain Old Telephone Service (POTS) signals from higher band communication signals within a customer's telephony wiring, the customer's telephony wiring having a POTS pair of lines for carrying the POTS signals to at least one POTS terminal device and a non-POTS pair of lines, the system comprising:

an interconnect device for receiving the POTS signals and higher band communication signals and for placing the POTS signals and higher band communication signals onto the non-POTS pair of lines in the customer's telephony wiring; and a line isolation device electrically connected to the non-POTS pair of lines for receiving the POTS signals and the higher band communication signals and for supplying at least the higher band communication signals to a transceiver unit, the line isolation device including a low pass filter for receiving the POTS signals and higher band communication signals from the non-POTS pair of lines and for outputting filtered POTS signals onto the POTS pair of lines in the telephony wiring;

wherein at least one telephone jack in the telephony wiring is connected to the POTS pair of lines for receiving the filtered POTS signals and for providing the filtered POTS signals to the POTS terminal device;

wherein the non-POTS pair of lines comprises B and Y lines of the customer's telephony wiring and the interconnect device places the POTS signals and higher band communication signals onto the B and Y lines.

9. The system as set forth in claim 8, wherein the interconnect devise comprises a network interface devise.

10. The system as set forth in claim 8, wherein the interconnect devise comprises an inside network interface device.

11. The system as set forth in claim 8, wherein the POTS pair of lines comprises red and green lines of the customer's telephony wiring and the line isolation device is for placing filtered POTS signals onto the red and green lines.

12. The system as set forth in claim 8, wherein the line isolation device comprises a communication jack for coupling at least the higher band communication signals to the transceiver unit.

13. The system as set forth in claim 12, wherein the communication jack comprises an RJ11 jack and receives the higher band communication signals at red and green contacts.

14. The system as set forth in claim 8, wherein the line isolation device includes a telephone jack for receiving the filtered POTS signals from the low pass filter.

15. The system as set forth in claim 8, further comprising a connector for connecting the line isolation device to the non-POTS pair of lines.

16. The system as set forth in claim 8, wherein the higher band signals comprise ADSL signals and the low pass filter is for removing the ADSL signals from the POTS signals.

17. A system for isolating Plain Old Telephone Service (POTS) signals from higher band communication signals within a customer's telephony wiring, comprising:

an interconnect device for receiving the POTS signals and higher band communication signals and for placing the POTS signals and higher band communication signals onto a first pair of lines in the telephony wiring;

a line isolation device electrically connected to the first pair of lines for receiving the POTS signals and the higher band communication signals and for supplying at least the higher band communication signals to a transceiver unit, the line isolation device including a low pass filter for receiving the POTS signals and higher band communication signals from the first pair of lines and for outputting filtered POTS signals onto a second pair of lines in the telephony wiring;

wherein at least one telephone jack in the telephony wiring is connected to the second pair of lines for receiving the filtered POTS signals;

the system further comprising a connector for connecting the line isolation device to the first pair of lines;

wherein the connector is for receiving a mating connector from the line isolation device with the connector shorting the first pair of lines to the second pair of lines when the mating connector is disconnected from the connector.

18. A method of enabling a customer's telephony wiring to receive both Plain Old Telephone Service (POTS) signals and higher band communication signals, comprising:

disconnecting incoming lines, which are for receiving the POTS signals and the higher band communication signals from a central office, from a first pair of lines within the customer's telephony wiring and connecting the incoming lines to a second pair of lines within the customer's telephony wiring;

selecting a first telephone jack as a communication jack;

connecting the second pair of lines to the communication jack and maintaining a connection between the first pair of lines and the communication jack;

connecting an input of a low pass filter to the second pair of lines and connecting an output of the low pass filter to the first pair of lines, the low pass filter for receiving the higher band communication signals and the POTS signals over the second pair of lines and for supplying filtered POTS signals on the first pair of lines; and maintaining a connection between the first pair of lines and at least one other telephone jack, the at least one other telephone jack for receiving the filtered POTS signals on the first pair of lines and for supplying the filtered POTS signal to a POTS terminal device;

wherein the higher band communication signals may be routed over the second pair of lines to a transceiver unit and the filtered POTS signals may be routed over the first pair of lines to the POTS terminal device.

19. The method as set forth in claim 18, wherein disconnecting the incoming lines and connecting tie incoming lines comprise disconnecting the incoming lines from R and G lines of the telephony wiring and connecting the incoming lines to B and Y lines of the telephony wiring.

20. The method as set forth in claim 18, wherein disconnecting and connecting the incoming lines occur within a device for connecting the customer's telephony wiring to the public switched telephone network.

21. The method as set forth in claim 18, wherein connecting the second pair of lines to the communication jack comprises connecting the communication jack to B and Y lines of the customer's telephony wiring and maintaining the connection between the first pair of lines and the communication jack comprises maintaining the connection between R and G lines of the customer's telephony wiring and the communication jack.

22. The method as set forth in claim 18, wherein connecting the input of the low pass filter to the second pair of lines comprises connecting the input of the low pass filter to B and Y lines of the customer's wiring and connecting the output of the low pass filter to the first pair of lines comprises connecting the output of the low pass filter to R and G lines of the customer's telephony wiring.

23. The method as set forth in claim 18, wherein maintaining the connection between the first pair of lines and the at least one other telephone jack comprises maintaining the connection between the at least one other telephone jack and the red and green lines of the customer's telephony wiring.

24. The method as set forth in claim 18, further comprising routing the filtered POTS signals over the first pair of lines to the POTS terminal device.

25. The method as set forth in claim 18, further comprising routing the higher band communication signals over the second pair of lines to the transceiver unit.

26. A method of enabling a customer's telephony wiring to receive both Plain Old Telephone Service (POTS) signals and higher band communication signals, comprising:

disconnecting incoming lines, which are for receiving the POTS signals and the higher band communication signals from a central office, from a first pair of lines within the customer's telephony wiring and connecting the incoming lines to a second pair of lines within the customer's telephony wiring;

selecting a first telephone jack as a communication jack;

connecting the second pair of lines to the communication jack and maintaining a connection between the first pair of lines and the communication jack;

connecting an input of a low pass filter to the second pair of lines and connecting an output of the low pass filter to the first pair of lines, the low pass filter for receiving the higher band communication signals and the POTS signals over the second pair of lines and for supplying filtered POTS signals on the first pair of lines; and maintaining a connection between the first pair of lines and at least one other telephone jack, the at least one other telephone jack for receiving the filtered POTS signals on the first pair of lines and for supplying the filtered POTS signal to a POTS terminal device;

wherein the higher band communication signals may be routed over the second pair of lines to a transceiver unit and the filtered POTS signals may be routed over the first pair of lines to the POTS terminal device;

the method further comprising disconnecting a transceiver unit from the communication jack and automatically shorting the first pair of lines to the second pair of lines.

27. A communication connector for use in carrying Plain Old Telephone Service (POTS) signals and higher band communication signals within a customer's telephony wiring, comprising:

a body having an orifice for receiving a mating connector;

a first coupling member located in the orifice for being connected to a first line within the telephony wiring;

a second coupling member located in the orifice for being connected to a second line within the telephony wiring;

a third coupling member located in the orifice for being connected to a third line within the telephony wiring;

a fourth coupling member located in the orifice for being connected to a fourth line within the telephony wiring;

a first shorting bar formed of an electrically conductive material;

a second shorting bar formed of the electrically conductive material; and means for placing the first coupling member and the second coupling member in electrical contact with the first shorting bar and for placing the fourth coupling member and third coupling member in electrical contact with the second shorting bar when the mating connector is withdrawn from the orifice and for separating the first coupling member and the second coupling member from the first shoring bar and for separating the fourth coupling member and the third coupling member from the second shorting bar when the mating connector is inserted into the orifice;

wherein the placing means shorts the first line to the second line and shorts the third line to the fourth line when the mating connector is withdrawn from the orifice;

the first and fourth lines of the customer's telephony wiring for carrying POTS signals and the higher band communication signals;

the first and fourth coupling members for passing the POTS signals and the higher band communication signals to the mating connector when the mating connector is inserted into the orifice;

the second and third coupling members for receiving filtered POTS signals from the mating connector when the mating connector is inserted into the orifice and for passing the filtered POTS signals onto the second and third lines of the customer's telephony wiring;

the first and fourth coupling members for receiving POTS signals from the first and fourth lines of the customer's telephony wiring when the mating connector is withdrawn from the orifice; and the second and third coupling members for receiving the POTS signals from the first and fourth coupling members, through the first and second shorting bars, when the mating connector is withdrawn from the orifice and for passing the POTS signals onto the second and third lines of the customer's telephony wiring when the mating connector is withdrawn from the orifice.

28. The connector as set forth in claim 27, wherein the first coupling member is for being connected to a B line within the telephony wiring, the second coupling member is for being connected to a R line within the telephony wiring, the third coupling member is for being connected to a G line within the telephony wiring, and the fourth coupling member is for being connected to a Y line within the telephony wiring.

29. A communication connector for use in carrying Plain Old Telephone Service (POTS) signals and higher band communication signals within a customer's telephony wiring, comprising:

a body having an orifice for receiving a mating connector;

a first coupling member located in the orifice for being connected to a first line within the telephony wiring;

a second coupling member located in the orifice for being connected to a second line within the telephony wiring;

a third coupling member located in the orifice for being connected to a third line within the telephony wiring;

a fourth coupling member located in the orifice for being connected to a fourth line within the telephony wiring;

a first shorting bar formed of an electrically conductive material;

a second shorting bar formed of the electrically conductive material; and means for placing the first coupling member and the second coupling member in electrical contact with the first shorting bar and for placing the fourth coupling member and third coupling member in electrical contact with the second shorting bar when the mating connector is withdrawn from the orifice and for separating the first coupling member and the second coupling member from the first shoring bar and for separating the fourth coupling member and the third coupling member from the second shorting bar when the mating connector is inserted into the orifice;

wherein the placing means shorts the first line to the second line and shorts the third line to the fourth line when the mating connector is withdrawn from the orifice; and wherein the placing means includes a spring having one end secured to the body and a mount secured to an opposite end of the spring, the first and second shorting bars are secured to the mount and the spring is for biasing the first shorting bar into contact with the first and second coupling members and for biasing the second shorting bar into contact with the third and fourth coupling members when the mating connector is withdrawn from the orifice.

30. The connector as set forth in claim 29, wherein the mount is for contacting the mating connector when the mating connector is inserted into the orifice, the mount compressing the spring when the mating connector is inserted to move the first shorting bar away from the first and second coupling members and to move the second shorting bar away from the third and fourth coupling members.

31. A communication connector for use in carrying Plain Old Telephone Service (POTS) signals and higher band communication signals within a customer's telephony wiring, comprising:

a body having an orifice for receiving a mating connector;

a first coupling member located in the orifice for being connected to a first line within the telephony wiring;

a second coupling member located in the orifice for being connected to a second line within the telephony wiring;

a third coupling member located in the orifice for being connected to a third line within the telephony wiring;

a fourth coupling member located in the orifice for being connected to a fourth line within the telephony wiring;

a first shorting bar formed of an electrically conductive material;

a second shorting bar formed of the electrically conductive material; and means for placing the first coupling member and the second coupling member in electrical contact with the first shorting bar and for placing the second coupling member and third coupling member in electrical contact with the second shorting bar when the mating connector is withdrawn from the orifice and for separating the first coupling member and the second coupling member from the first shoring bar and for separating the second coupling member and the third coupling member from the second shorting bar when the mating connector is inserted into the orifice;

wherein the placing means shorts the first line to the second line and shorts the third line to the fourth line when the mating connector is withdrawn from the orifice; and wherein the placing means comprises mounting members for mounting the first and second shorting bars to the body, the mounting members placing the first and second shorting means at first and second locations, respectively, so that the first and second coupling members contact the first shorting bar and the third and fourth coupling members contact the second shorting bar when the mating connector is withdrawn from the orifice.

* * * * *

UNITED STATES PATENT AND TRADEMARK OFFICE
CERTIFICATE OF CORRECTION

PATENT NO.     : 6,449,362 B1
DATED          : September 10, 2002
INVENTOR(S)    : Tennyson et al.

It is certified that error appears in the above-identified patent and that said Letters Patent is hereby corrected as shown below:

Column 12,
Line 60, delete the first occurance of the word "devise" and insert the word -- device -- therefor;
Line 60, delete the second occurance of the word "devise" and insert the word -- device -- therefor;
Line 62, delete the word "devise" and insert the word -- device -- therefor;
Line 67, please delete "red and green" and insert -- R and G --;

Column 13,
Line 7, please delete "red and green" and insert -- R and G --;

Column 14,
Line 8, delete "tie" and insert the word -- the -- therefor;
Line 35, please delete "red and green" and insert -- R and G --;

Column 15,
Line 33, delete "shoring" and insert the word -- shorting -- therefor;

Column 16,
Line 34, delete "shoring" and insert the word -- shorting -- therefor; and Column 17,
Line 17, delete "shoring" and insert the word -- shorting -- therefor.

Signed and Sealed this

Twenty-fifth Day of March, 2003

JAMES E. ROGAN
*Director of the United States Patent and Trademark Office*